Feb. 16, 1971  JEAN-MICHEL CATHERIN  3,564,370
APPARATUS FOR REGULATING THE SPEED OF LOW SPEED ELECTRIC
COMMUTATOR MOTORS THROUGH THE USE
Filed May 20, 1968  OF SYNCHRONIZED BOOSTING SIGNALS
2 Sheets-Sheet 1

United States Patent Office 3,564,370
Patented Feb. 16, 1971

3,564,370
APPARATUS FOR REGULATING THE SPEED OF LOW SPEED ELECTRIC COMMUTATOR MOTORS THROUGH THE USE OF SYNCHRONIZED BOOSTING SIGNALS
Jean-Michel Catherin, Savigny-sur-Orge, France, assignor to Compagnie Generale d'Electricite, Paris, France, a French corporation
Filed May 20, 1968, Ser. No. 730,531
Claims priority, application France, May 19, 1967, 107,050; June 16, 1967, 110,796
Int. Cl. H02p 5/06
U.S. Cl. 318—343         6 Claims

ABSTRACT OF THE DISCLOSURE

A device for eliminating the speed fluctuation of low speed electric motor due to the simultaneous passage of plural commutator segments under the motor's brushes, which causes the motor's impedance to be periodically lowered which, in turn, causes a fluctuation in input voltage to the motor and a corresponding fluctuation in motor speed. The device is coupled to the motor shaft and acts on the supply current to the motor to produce a voltage fluctuation which is of the same frequency and amplitude as that due to lowered motor impedance, and in phase opposition thereto.

BACKGROUND OF THE INVENTION

It is common to energize the armature windings of an electric motor by the use of a commutator segments electrically connected to the windings which segments are physically connected to the motor shaft and are in electrical contact with brushes carrying the input current.

In certain motor designs, the input burshes can simultaneously contact two adjacent commutator segments which causes the impedance of these motors to drop and thus the input voltage to the motor to drop. As the motor rotates and adjacent commutator segments are contacted by the brushes, a cyclic drop in voltage occurs which causes a drop in the top motor speed which may reach five percent of the design speed.

Of course, this effect is felt only in low-speed motors, such as those having a speed of the order of one revolution per second and which are employed for example, for servo-control, because at high speeds this fluctuation or undulation is integrated and thus ceases to be perceptible.

SUMMARY OF THE INVENTION

The apparatus according to the invention, which eliminates this disadvantage, comprises means associated with the shaft of the motor and acting on the supply voltage of the latter to produce a fluctuation of this voltage of the same frequency and amplitude as the voltage fluctuation due to the commutator and in phase opposition thereto. Thus, these two voltage fluctuations compensate for one another and cancel one another out.

Figure 1:
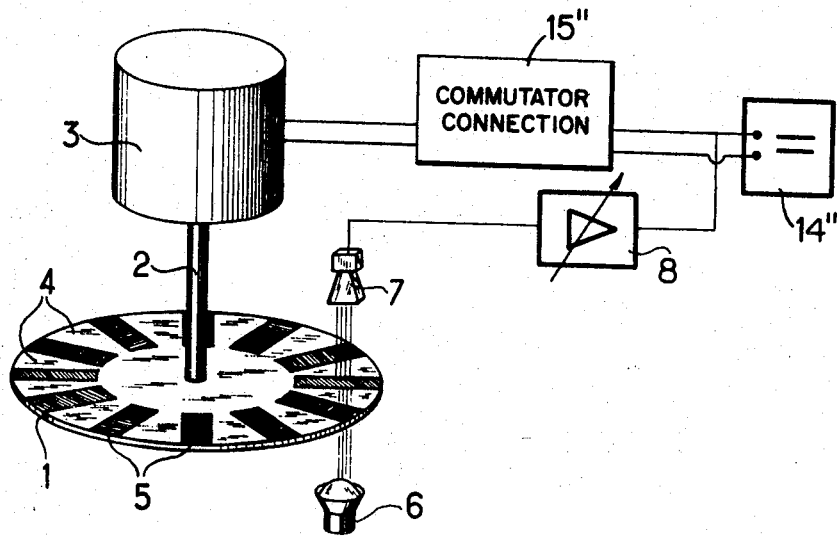
FIG. 1 is a perspective view of one embodiment of the present invention.
Figure 2:
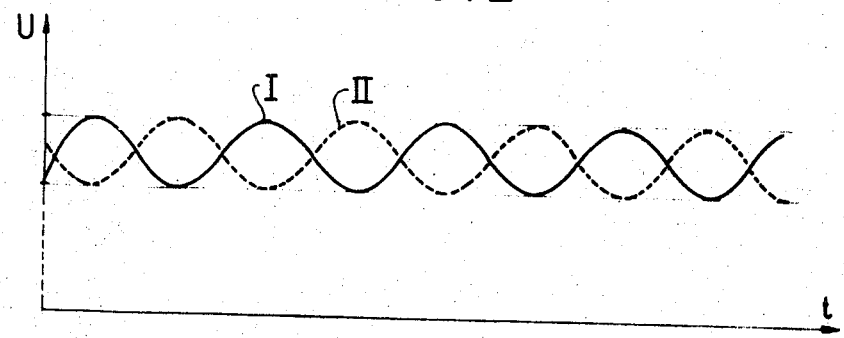
FIG. 2 is a graph of the applied voltage and the commutator voltage of the motor of FIG. 1.
Figure 3:
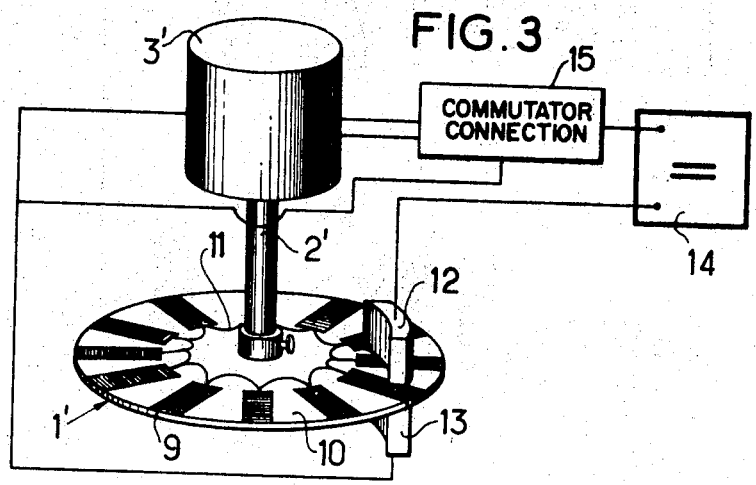
FIG. 3 is a perspective view of another embodiment of the present invention.
Figure 4:
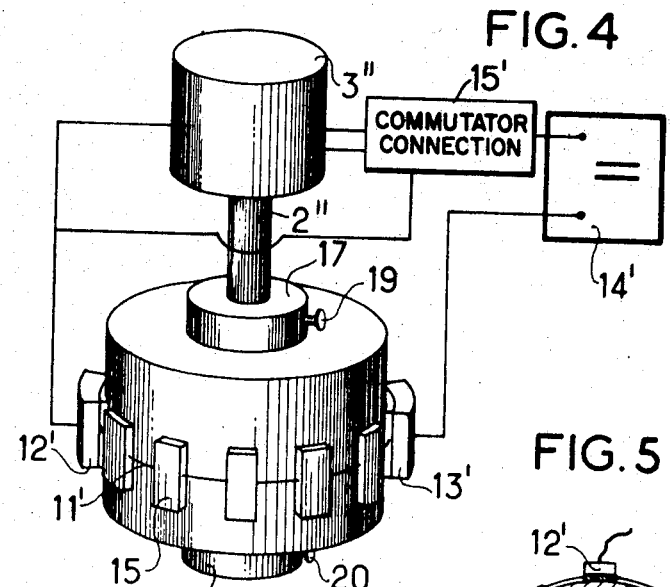
FIG. 4 is a perspective view of yet another embodiment of the present invention.
Figure 5:
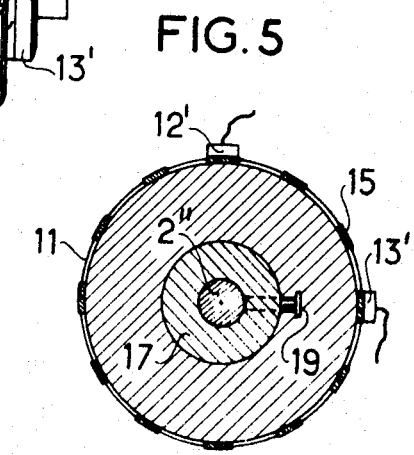
FIG. 5 is a diagrammatic view of a portion of the apparatus of FIG. 4.

The accompanying FIGS. 1 and 2 relate to an embodiment in which electro-optical means are employed. FIGS. 3 to 5 relate to the embodiments in which electro-mechanical means are employed. The apparatus according to FIG. 1 comprises a disc 1 keyed on the shaft 2 of the motor 3 and comprises on its periphery, transparent sectors 4 equal in number to the segments of the commutator (not shown), and separated from one another by sectors such as 5 which have a certain opacity. A light source 5 illuminates, through the disc 1, a photoelectric cell 7 whose output voltage is applied to the motor 3 through a variable-gain amplifier 8. Of course, motor 3 is also supplied with current from current supply 14 through commutator connection 15.

This amplifier is so adjusted that the amplitude of the voltage undulation of fluctuation in amplitude applied to the motor, is equal to the voltage fluctuation due to the passage of the segments of the commutator under the brushes. The disc 1 is keyed on the shaft 2 in such manner that the said first voltage undulation I is in phase opposition to the second undulation II as shown in FIG. 2.

Of course, other forms of construction could be employed. For example, the light ray could reach the cell after reflection on the clear sectors of the disc, and not by transparency through these sectors. In addition, the cell could be a photo-resistive cell connected in series in a circuit including a current source by which the motor is fed.

In the embodiments of FIGS. 3 to 5, there are employed electromechanical means consisting essentially of a member driven by the shaft of the motor, on which are mounted conductive sectors separated from one another and equal in number to the segments of the commutator of the motor. Cooperating therewith are contact members inserted in the supply circuit of the motor.

Such a device is more massive and less costly than a device comprising electro-optical means. Further, it makes it possible to avoid the use of the amplifier which is necessary in the apparatus of the electro-optical type.

In FIG. 3, the disc 1' is coupled to the shaft 2' of the motor 3'. This disc is an insulator and comprises, on at least one of its faces, conductive sectors such as 9 separated from one another by gaps such as 10, but electrically connected together by more or less resistive conductor wires such as 11.

The other face of the disc may comprise either a series of similar sectors or a continuous conductive surface, these surfaces being in any case in electrical contact with the sectors of the other face.

Mounted in frictional contact with the two faces of the disc are brushes 12 and 13 respectively, which are connected in series in a circuit including a current source 14 by which the motor 3' is supplied through commutator connection 15.

When the disc rotates, the conductance of the surface along which the brushes are in contact varies, whereby, the resistance of the supply circuit of the motor is varied to produce an applied voltage fluctuation.

The surface of the brushes and that of the conductive sectors, and also the spacing between the latter, is so adjusted that the voltage fluctuation thus produced has the same amplitude as that produced by the commutator segments of the motor. It is also possible to adjust the resistance of the wires 11 which connect the various sectors together. In order to bring these two fluctuations into phase opposition, it is sufficient to adjust the angle at which the disc is set in relation to the shaft of the motor.

It is also possible to arrange the brushes 12 and 13 in such manner that they are both in frictional engagement with a common face of the disc.

FIGS. 4 and 5 illustrate an embodiment in which the conductive sectors 15 are strips disposed on the periphery of a cylinder 16 fixedly mounted on the shaft 2" of the motor 3" by means of bearings 17, 18 and locking members such as screws 19, 20, with the brushes 12', 13' rubbing on the said strips.

In all other respects, current source 14' and strip connector wire 11' are identical in form and function to the embodiment of FIG. 3.

What is claimed is:

1. Apparatus for eliminating the fluctuation in speed of low-speed electric commutator motors due to the simultaneous passage of plural commutator segments under the brushes, and concurrent lowering of motor impedance and input voltage, said apparatus comprising: first means operatively connected to the motor shaft and acting on the supply current of said motor to produce an applied voltage fluctuation which is of the same frequency and amplitude as said input voltage fluctuation due to lowered motor impedance, and second means for coupling the applied voltage fluctuation in phase opposition thereto.

2. The apparatus of claim 1, wherein the first means comprises a disc having transparent sectors, equal in number to the segments of the commutator separated by relatively opaque sectors, a light source illuminating through the said disc and a photoelectric cell in line therewith and a variable-gain amplifier coupling said cell to the motor, and wherein said second means comprises means for keying said disc to the shaft of the motor such that the voltage fluctuation which it produces is in phase opposition to that due to the passage of the commutator segments.

3. The apparatus of claim 1, wherein said first means comprises a member driven by the motor shaft, conductive sectors equal in number to the segments of the commutator carried by said member, contact members connected in series with the motor supply voltage of the motor and operatively contacting said member to produce voltage fluctuation of the same frequency and amplitude as that due to the passage of the commutator segments under the brushes, and in phase opposition to the latter undulation.

4. The apparatus of claim 3, wherein the member supporting the conductive sectors is a disc.

5. The apparatus of claim 3, wherein the member supporting the conductive sectors is an insulating cylinder.

6. The apparatus of claim 3 further including means for adjusting the angular position of said member with respect to said motor shaft.

References Cited

UNITED STATES PATENTS

| | | | |
|---|---|---|---|
| 2,743,408 | 4/1956 | Schmitt | 318—349X |
| 3,179,865 | 4/1965 | Carton | 318—20.525 |
| 3,351,831 | 11/1967 | Hemphill et al. | 318—349X |
| 3,414,790 | 12/1968 | Auld | 318—345X |

ORIS L. RADER, Primary Examiner

H. HUBERFELD, Assistant Examiner

U.S. Cl. X.R.

318—18, 347, 439